United States Patent

[11] 3,607,675

[72] Inventor Robert S. Haines
Boulder, Colo.
[21] Appl. No. 791,161
[22] Filed Jan. 14, 1969
[45] Patented Sept. 21, 1971
[73] Assignee International Business Machines Corporation
Armonk, N.Y.

[54] MANUFACTURE OF MAGNETIC PARTICLES BY ELECTRODEPOSITION OF IRON, COBALT, OR NICKEL IN DIALKYL SULFOXIDE
25 Claims, No Drawings

[52] U.S. Cl. .................... 204/10, 204/38 E, 204/48
[51] Int. Cl. .................... C22d 5/00, C23f 17/00
[50] Field of Search .................... 204/10, 38.42, 48

[56] References Cited

UNITED STATES PATENTS

| | | | |
|---|---|---|---|
| 2,533,096 | 12/1950 | Cudd et al. | 204/10 |
| 3,198,717 | 8/1965 | Falk | 204/10 |
| 3,262,812 | 7/1966 | Falk | 204/10 X |
| 3,409,466 | 11/1968 | Slay, Jr. et al. | 117/212 |
| 3,485,725 | 12/1969 | Koretzky | 204/48 X |

*Primary Examiner*—Daniel E. Wyman
*Assistant Examiner*—C. F. Dees
*Attorney*—Abraham A. Saffitz

ABSTRACT: The invention relates to the preparation of fine ferromagnetic particles by electrodeposition of iron, nickel, cobalt, or mixtures of these metals, in a dialkyl sulfoxide bath, such as dimethyl sulfoxide, the particles produced at the electrode being removed at desired intervals. Heat-stable organic binders may be dissolved in the plating bath during electrodeposition to coat the formed particles and thereby inhibit surface oxidation and agglomeration. The particles are oblong in shape and, coated or uncoated, are especially useful for magnetic recording media, magnetic cores, magnetically responsive fluid suspensions and permanent magnets.

MANUFACTURE OF MAGNETIC PARTICLES BY ELECTRODEPOSITION OF IRON, COBALT, OR NICKEL IN DIALKYL SULFOXIDE

BACKGROUND OF THE INVENTION

The present invention relates to the preparation of ferromagnetic particles of size between 0.03 and 0.8 micron by electrodeposition of iron metals, nickel, cobalt, or mixtures of these metals in a dialkyl sulfoxide bath, especially dimethyl sulfoxide (DMSO), the particles formed at the electrode and removed from the bath being oblong in shape and adapted for use in magnetic recording media, permanent magnets, magnetic cores and magnetically responsive fluid suspensions, such as electrostrictive clutch couplings or the like.

The preferred method of the present invention consists of dissolving salts of iron, nickel or cobalt in dimethyl sulfoxide (DMSO) and utilizing the solution as a plating bath for electrodeposition in which the anode is preferably of the same metal as the metal salt in order to eliminate trace impurities which diminish magnetic properties. However, an inert anode and an inert cathode may be used, such as an electrode formed of platinum or carbon. The plated magnetic particles thus produced are preferably collected by frequent washing of the cathode with a solvent, or by utilizing ultrasound at the cathode to continuously remove the particles. Direct current or alternating current may be used for electrodeposition. When alternating current is used, the fine metal particles are collected at both electrodes, washing may be carried out at both electrodes, and, in this instance, it is preferable that both electrodes be of the same metal as the metal salt. Removal may be facilitated by brushing the electrode. Removal may be continuous or by batch techniques.

The dialkyl sulfoxide which serves to dissolve the salt of iron, nickel, cobalt, or mixtures is also a solvent for heat stable organic polymer binders for the metal, and, for the purpose of preparing magnetic recording media and magnetic responsive fluids, these polymers are added to the plating bath during electrodeposition. These polymers are immediately coated around the formed metal particles and this serves to avoid their agglomeration and to inhibit surface oxidation under the conditions of deposition.

In order to prepare high-quality, thin magnetic tapes and magnetic recording media, it is desirable to have small oblong magnetic particles of less than about 1 micron, with a substantial portion of the particles being less than 0.1 micron in length. In order to obtain higher output and improved magnetic characteristics in magnetic media, it is also preferred that the magnetic particles be mixtures or alloys of iron and/or cobalt and/or nickel rather than the oxides of iron, nickel, or cobalt. However, the surface or shell of the metal particles may be oxidized or may contain hydroxides, sulfides, etc.

By dissolving salts of iron, nickel, cobalt, or mixtures in dimethyl sulfoxide (DMSO) and by using either an inert electrode (platinum or carbon cathode) or a cathode of the same metal as in the salt, and by passing a direct current through the solution, the particles are collected on the cathode. The particles may be removed by a batch method by washing with organic solvent every 1 to 3 minutes. If the cathode is immersed in an ultrasonic field, the particles are continuously removed. If, instead of a direct current, an alternating current is used, the particles are collected on both electrodes and are removed from both electrodes.

Any water-soluble salts, organic or inorganic, may be used of the iron, nickel, or cobalt, such as the chloride, sulfate, nitrate, acetate, propionate, etc., for inclusion in the dialkyl sulfoxide bath.

It is an advantage of the present invention that heat-stable, organic, film-forming polymers can be dissolved in the nonaqueous dialkyl sulfoxide electrolyte to coat the magnetic particles as they are deposited by direct current or alternating current at the electrode or electrodes, thus preventing them from becoming agglomerated to form metal clumps and inhibiting surface oxidation of the metal particles.

The film-forming polymers are adapted for the preparation of magnetic media and are heat-stable, flexible, tough and age-resistant polymers uniquely adapted as coating and binders. Preferred examples are copolymers of acrylonitrile and styrene, copolymers of acrylonitrile and butadiene, polyarylimides, polyamides, polyphenyl ether, polyesters, vinyl chloride polymers, cellulose esters such as cellulose acetate and cellulose ethers, aromatic polycarbonates, acrylate and styrene copolymers, epoxy resins, silicone resins, fluorinated resins, vinyl chloride vinyl acetate copolymer, polyacrylic esters and polyurethanes, including those based upon blocked polyisocyanates of the type shown in U.S. Pat. No. 2,855,421 reacted with elastic aromatic polyesters of the type shown in Snyder U.S. Pat. Nos. 2,623,031 and 2,623,033. In the preparation of magnetic media, a wide variety of solvents in addition to dialkyl sulfoxide may be used for forming a dispersion of the fine particles and binders. Organic solvents, such as ethyl, butyl and amyl acetate, isopropyl alcohol, dioxane, acetone, methylisobutyl ketone, cyclohexanone, and toluene are frequently used for this purpose. The particle-binder dispersion may be applied to a suitable substrate by roller coating, gravure coating, knife coating, extrusion or spraying of the mix onto the backing or by other known methods. The specific choice of known methods. The specific choice of nonmagnetic support, binder, solvent or method of application of the magnetic particles to the support will vary with the properties desired and the specific form of the magnetic recording medium being produced.

In addition to binders, lubricants, such as silicone oil, graphite, molybdenum disulfide, oleyl butyrate ester, oleic acid amide, and the like may be used in preparing magnetic recording media, such as video tapes, computer tapes, and sound tapes.

In preparing magnetic recording media, the magnetic particles usually comprise about 40–90 percent by weight of the film layer applied to the substrate. The substrate is usually a flexible paper, polyester or cellulose acetate material, although rigid base material of plastic or metal is more suitable for some uses.

In preparing magnetic cores and permanent magnets, the particles are mixed with nonmagnetic plastic or filler in an amount of 33–50 percent by volume of the finished magnetic metal, the particles aligned in a magnetic field and the mixture pressed into a firm magnet structure. Alignment of the particles may be accomplished in an externally applied DC magnetic field of about 4,000 gauss or more and field up to 28,000 gauss may be used. Pressures may vary widely in forming the magnet, and pressures up to 100,000 p.s.i. have been used commercially.

The polymers dissolved in the DMSO that coat the magnetic particles as they form on the electrode include those polymers which have functional groups in the binder system of the magnetic media. Mixtures of polymers can be used which contain reactive groups or different groups may occur in the same polymer to form thermoset binder systems.

The DMSO is such a strong solvent and so effective as an organic electrolyte that where enhanced solubility for low-soluble resins is desired or is required for mixed polymer additions where incompatibility is to be overcome, it may be modified with small amounts of other nonconducting, nonaqueous solvents without inhibiting its strong wetting properties for the fine electrodeposited metal particles. An illustration is the addition of dimethyl formamide to a mixture of high nitrile butadiene-acrylonitrile copolymer and hydrolyzed polyvinyl acetate in the DMSO bath.

It is unusual and unexpected to find that elongated particles of very small diameter (of the order of several hundred Angstroms minimum dimension) can be formed in dialkyl sulfoxide since this medium has been proposed as a bath for electroless deposition of superconductive lead in a continuous film on a base metal, such as copper in Slay, Jr. et al., U.S. Pat. No. 3,409,466. One would assume that the mild current and voltage requirements would produce a continuous thin film of highly pure magnetic metal plated on the electrode. Manifestly, the wetting characteristics of dialkyl sulfoxide for the elongated electrodeposited magnetic metal particles are based upon different physical forces than those forces which are present in the electroless plating of superconductive lead from lead salts in dimethyl sulfoxide. These different forces appear to favor the formation of discrete particles and to permit ready dislodging of the particles which adhere loosely to the electrode. Dialkyl sulfoxide apparently imparts a unique wetting action while the particles are formed which prevents agglomeration of particles into aggregates and facilitates removal of the particles by washing or by ultrasonic vibrations or by mechanical means. Although the preferred electrolytic bath employs dimethyl sulfoxide undiluted, dilution with water or with any miscible solvent is operable.

The currents and voltages which are required in the DMSO bath to deposit the particles at the electrode are well below 100 amp./sq. ft. and under 200 volts. The preferred currents and voltages are less and in the present examples, the preferred voltage is from 25–75 volts and the preferred current density is from 8–30 amp./sq. ft.

Under conditions of particle removal created by washing with water-immiscible solvent or by ultrasonic forces, the particles which are formed are prevented from agglomerating to form clumps, and a remarkably narrow range of submicron particle sizes is formed. The unusually high degree of purity which is achieved from the electrolysis in the dialkyl sulfoxide medium and the utility of the film-forming polymers as coatings for the dispersed particles in the electrolyte prevents agglomeration and limits surface oxidation to thereby achieve novel and unusually beneficial magnetic compositions.

Since these novel compositions include discrete particles which are coated with polymers, they do not agglomerate in storage and do not have to be extensively ball milled or specially treated when preparing magnetic media, such as magnetic tapes.

It has been found that if shape-modifying additives, such as sucrose, biphenyl and saccharin are added to the solution of the transition metal salts in dialkyl sulfoxide prior to electrolysis, a nondendritic, more uniform, oblong shape of magnetic alloy particle is formed.

In the case of mixtures of iron and cobalt salts, these shape-forming additives provide especially useful results.

For reasons of economy, dimethyl sulfoxide is preferred, but diethyl sulfoxide, dipropyl sulfoxide, dibutyl sulfoxide and diisobutyl sulfoxide may be used. Unsymmetrical sulfoxides may be used, such as methyl ethyl sulfoxide and methyl isobutyl sulfoxide.

DESCRIPTION OF THE PREFERRED EMBODIMENTS

The foregoing and other objects, features and advantages of the invention will be apparent from the following more particular description of preferred embodiments of the invention.

The following examples are given by way of pointing out critical aspects of the invention and preferred embodiments.

EXAMPLE 1A—CONTINUOUS FERROMAGNETIC FILM ELECTROPLATING FROM AQUEOUS BATH

Examples 1A and 1B were performed to show that metal salts dissolved in water do not yield ferromagnetic particles when electroplated and that metal salts dissolved in dialkyl sulfoxide produce discontinuous ferromagnetic particles on a platinum cathode. Discontinuous particles are undesirable as a ferromagnetic plating if a high-quality electroplated finish is desired.

Ten grams $FeCl_2.4H_2O$ were dissolved in 100 ml. of water and plated with a 30-volt DC source at a current density of 32.5 amp./sq. ft. It was necessary to put a resistance in the line to cut the current density from the DC supply to this value since an aqueous solution is a better conductor (has less resistance) than a dimethyl sulfoxide solution. Circular discs of platinum were used for the electrodes. A continuous film of iron, which had a bright metallic luster, was plated on the cathode.

Similarly, a continuous film of cobalt, which had a bright metallic luster, was plated when 10 grams of $CoCl_2$ were dissolved in 100 ml. of water and plated with a 30-volt DC source at a current density of 32.5 amp./sq. ft.

EXAMPLE 1B—ELECTROPLATING OF FERROMAGNETIC PARTICLES ON PLATINUM CATHODE FROM DIALKYL SULFOXIDE BATH

Ten grams of $FeCl_2.4H_2$ were dissolved in 100 ml. of dimethyl 2and plated with a 30-volt DC source at a current density of 32.5 amp./sq. ft. using the same plating system as in example 1A, but without added resistance. Poorly adherent, discontinuous magnetic black particles were deposited on the circular disc platinum cathode.

A similar discontinuous black magnetic deposit was also plated on the circular disc platinum anode when 10 grams of $CoCl_2$ were dissolved in 100 ml. of dimethyl sulfoxide and plated with a 30-volt DC source at a current density of 32.5 amp./sq. ft.

By X-ray diffraction it was found that the particles generally had an oxide shell which constituted from about 1 to 10 percent by weight of their mass. The amount of oxide formed was a function of the bath temperature and voltage.

The current density used in the production of the magnetic particles varied from 4 to 60 amp./sq. ft. The particles are removed from the platinum cathode in the form of magnetic particles by placing a magnet under the platinum cathode and by agitating the plating solution or by agitating the cathode. The magnetic particles are thus sloughed off the platinum cathode as they form and are attracted by the magnetic field. An AC plating source was also used with the same result. Some degree of agitation, washing, or mechanical removal, is generally necessary in order to detach or break up the loosely adherent particles at the electrode.

EXAMPLE 2—WASHING WITH DICHLOROMETHANE TO PRODUCE OBLONG

PARTICLES OF 0.2- TO 0.5-MICRON RANGE

This example illustrated electrolysis of an inorganic salt in dimethyl sulfoxide at room temperature and with agitation to produce fine oblong ferromagnetic particles.

Ten grams of $FeCl_2.4H_2O$ were dissolved in 100 ml. of dimethyl sulfoxide and plated with a 60-volt DC source at a current density of 57 amp./sq. ft. for 30 minutes. The resultant magnetic powder was then washed three times in dichloromethane and the magnetic powder was recovered after the dichloromethane from the last wash had evaporated. If this washing and evaporation routine were not followed, the magnetic powder would be pyrophoric. X-ray diffraction analysis of the powder showed it to consist of an α-iron center with a magnetite shell ($Fe_3O_4$). The range of particle size of the powder was determined and all of the particles were oblong and from about0.2 to 0.5 micron in long dimension. The magnetic characteristics were determined on a VSM (vibrating sample magnetometer) with an applied field of 4,000 oersteds.

| | |
|---|---|
| Ms at 4,000 oe. | 74 emu (electromagetic units)/g. |
| Hc | 360 oe. |

EXAMPLE 3—WASHING WITH DICHLOROMETHANE TO PRODUCE OBLONG

PARTICLES OF 0.15- TO 0.30-MICRON RANGE AND

REDUCING WITH HYDROGEN

This example illustrates after-reduction of the magnetic particles with hydrogen at 400° C., the particles being formed under conditions similar to those in example 2.

Nineteen and nine-tenths gm. of $FeCl_2.4H_2O$ were dissolved in 100 ml. of dimethyl sulfoxide and plated with a 30-volt DC source at a current density of 14.6 amp./sq. ft. The particles produced were washed three times with dichloromethane as in example 2 and the last washing of dichloromethane was evaporated, as in example 2.

The recovered magnetic particles were oblong in shape and consisted of a center of $\alpha$-iron which had a surface coating or outer shell of magnetite. The particle size was about 0.2 to about 0.35 micron.

The magnetic properties, when run of a VSM with a 4,000 oe. field, were:

| | |
|---|---|
| Ms at 4,000 oe. | 105 emu/g. |
| Hc | 151 oe. |

When these particles of magnetic $\alpha$-iron center coated with a magnetite ($Fe_3O_4$) shell were reduced with hydrogen at 400° C. for 4 hours, then cooled and a stream of $CO_2$ from dry ice flowed over it for 5 hours, the resultant reduced and pure iron powder had a particle size of 0.15 to 0.30 micron characterized by an oblong shape including dendrites. The following magnetic characteristics were determined on a VSM with a 4,000 oe. field:

| | |
|---|---|
| Ms 4,000 oe. | 173 emu/g. |
| Hc | 94 oe. |

EXAMPLE 4—PRODUCTION OF MIXTURE OF 20 PERCENT COBALT AND 80 PERCENT IRON

PARTICLES BY DMSO PLATING AND HYDROGEN REDUCTION

GIVING A PARTICLE SIZE OF 0.07 to 0.09 MICRON

A mixture of cobalt and iron salts can be plated to give magnetic particles with a cobalt-iron center and iron oxide (magnetite) shell.

Five grams of $CoCl_2.6H_2O$ and 6 gm. of $FeCl_2.4H_2O$ were dissolved in 100 ml. of dimethyl sulfoxide and plated using platinum electrodes with a 30-volt DC supply at a current density of 57 amp./sq. ft. The magnetic particles produced were washed three times with dichloromethane, with the last wash of dichloromethane left to evaporate. The particles consisted of 80 percent iron and 20 percent cobalt. The particles had an oxide coating, e.g. a coating of magnetite, and the oxide-coated particles were oblong in shape and less than 0.1 micron.

The resulting particles had the following magnetic characteristics when run on the VSM:

| | |
|---|---|
| Ms 4,000 oe. | 82 emu/g. |
| Hc | 520 oe. |

When these oxide-coated particles were reduced with hydrogen at 400° C. for 4 hours, cooled with hydrogen flowing over them, then a stream of $CO_2$ from dry ice flowed over hem of 5 hours, the resultant pure powder had a particle range of 0.07 to 0.09 micron, the particles were oblong in shape and had the following magnetic characteristics:

| | |
|---|---|
| Ms 4,000 oe. | 174 emu/g. |
| Hc | 340.9 oe. |

Other reducing gases may be used instead of hydrogen, such as carbon monoxide.

EXAMPLE 5—PREPARATION OF MIXTURE OF 55 PERCENT IRON,

35 PERCENT COBALT, 10 PERCENT NICKEL POWDER OF

0.3- TO 0.6-MICRON RANGE nickel, cobalt and iron salts can be dissolved in dimethyl sulfoxide and used to plate magnetic particles containing these three transition elements. 0.5 gram of $NiCl_2.6H_2O$, 2.6 gram of $CoCl_2$ and 4.0 gram of $FeCl_2.4H_2O$ were dissolved in 100 ml. of dimethyl sulfoxide and plated using platinum electrodes with a 30-volt DC supply at a current density of 22 amp./aq. ft. The magnetic particles produced were washed three times with dichloromethane. The last wash of dichloromethane was allowed to evaporate rather than being poured off so that the particles could develop an oxide coating and not be pyrophoric. The resulting particles had the following magnetic properties when run on the VSM:

| | |
|---|---|
| Ms 4,000 oe. | 84.5 emu/g. |
| Hc | 294 oe. |

When these particles were reduced with hydrogen at 400° C. for 4 hours, then cooled with hydrogen flowing over them, and then treated with a stream of $CO_2$ from dry ice for 5 hours, the resultant powder had an oblong shape, a particle size range of 0.3 to 0.6 micron and had the following magnetic characteristics:

| | |
|---|---|
| Ms 4,000 oe. | 169 emu/g. |
| Hc | 143 oe. |

Thus, it is seen from examples 3, 4, and 5 that various Ms values and various coercivities can be obtained in accordance with the degree of surface oxidation of the metal, the metal mixture, or the metal alloy particles. Surface oxidation can be decreased by reduction with hydrogen. Less oxidation at the surface of the particle increases the Ms value.

A number of electroplating aids were added to the dimethyl sulfoxide metal salt baths, such as sodium saccharin, biphenyl and sucrose from which improved operation resulted. A number of heat-resistant polymers were added, such as Epon 1,001 (an epoxy resin marketed by Shell Chemical Company), Tyril 760 (24 percent acrylonitrile, 76 percent styrene copolymer marketed by Dow Chemical Company), and Convolex 10 oil (a liquid polyphenyl ether marketed by Consolidated Vacuum Corporation). These polymers promoted the dispersion of the metal particles and permitted the recovery of the disaggregated particles in a matrix of heat-stable resin in a form useful for magnetic tapes and similar magnetic media.

These polymer binder additives are uniquely adapted for addition to the DMSO plating bath and could not be dissolved in aqueous plating baths. These polymers may be brought into solution with a cosolvent, such as acetone, dimethyl formamide, butyl acetate, toluene, methyl ethyl ketone, methyl isobutyl ketone, amyl acetate, cyclohexane, cyclohexanone, tetralin and the like.

EXAMPLE 6—OIL-COATED IRON PARTICLES (MAGNETITE

SHELL-$\alpha$-IRON CENTER) OF 0.06 TO 0.13 MICRON

One and ninety-nine-hundredths gram of $FeCl_2.4H_2O$ and 0.125 gram of Convolex 10 oil (polyphenyl ether) were dissolved in 100 ml. of dimethyl sulfoxide and plated with a 30-volt DC source at a current density of 12.2 amp./sq. ft. The magnetic iron particles produced were washed three times with dichloromethane, the last wash of dichloromethane being allowed to evaporate rather than being poured off. The resulting particles had an oblong shaped and a particle size range of 0.06 to 0.13 micron and had the following properties when run on the vsm:

| | |
|---|---|
| Ms 4,000 oe. | 89 emu/g. |
| Hc | 218 oe. |

The above plating solution consisted of 1.78 percent iron chloride, 0.1 percent Convolex oil by weight.

The composition comprising the mixture of heat-resistant polyphenyl ether and magnetic particles is directly useful in magnetic recording media in the proportions of this example, or the composition may be diluted to provide a magnetic or an electrostrictive fluid of the type shown in Winslow, U.S. Pat. No. 2,417,850, and Rabinow, U.S. Pat. No. 2,575,360. The oil-diluted composition may be used, as in Rabinow, as the thickenable fluid responsive to a magnetic field for coupling and power transmission in a clutch or as in Winslow, U.S. Pat. No. 2,886,151, for rotor coupling. Filler particles may be incorporated in the magnetic or electrostrictive compositions, such as Teflon fluorinated resin particles which function as a lubricant (see Fith, U.S. Pat. No. 3,002,596) or silica gel, barium titanate, or magnesium silicate, as in Winslow, U.S. Pat. No. 3,047,507. The polyphenyl ether liquid completely disperses the very fine magnetic iron particles and there is no evidence of aggregation or clumping. This high degree of dispersion is achieved with solid polymers of the later examples herein. This dispersion with liquid and solid polymers cannot be obtained if a dialkyl sulfoxide liquid medium is not employed as the bath for electrolytic decomposition of the ferromagnetic salt.

EXAMPLE 7—OIL-COATED IRON PARTICLES (MAGNETITE SHELL, α-IRON CENTER) OF PARTICLE SIZE OF 0.16 TO 0.25 MICRON

The procedure of example 6 was repeated for the following recipe:

Ten grams $FeCl_2.4H_2O$ and 0.125 gram Convolex 10 oil were dissolved in 100 ml. of dimethyl sulfoxide and plated with a 30-volt DC source. The current density was 32.5 amp./sq. ft. The magnetic particles produced were washed three times with dichloromethane, the last wash of dichloromethane being allowed to evaporate rather than being poured off. The resulting particles had an oblong shape, a particle size range of 0.16 to 0.25 micron and had the following magnetic properties when run on the VSM:

| | |
|---|---|
| Ms 4,000 oe. | 123 emu/g. |
| Hc | 302 oe. |

The utility of the product of this example is the same as for the product of example 6.

The plating solution of this example contained 8.3 percent iron chloride and 0.1 percent Convolex 10 oil by weight.

EXAMPLE 8—HEAT-STABLE STYRENE-ACRYLONITRILE COATED IRON PARTICLES OF 0.3 to 0.6 MICRON FOR MAGNETIC MEDIA

In this case, Tyril 760 (24 percent acrylonitrile, 76 percent styrene) was used in solution instead of Convolex 10 oil. Ten grams of $FeCl_2.4H_2O$ were dissolved in 100 ml. of dimethyl sulfoxide and plated with a 30-volt DC source at a current density of 32.5 amp./sq. ft. The magnetic particles produced were washed three times with dichloromethane, the last wash being allowed to evaporate rather than being poured off. The resulting particles had an oblong shape, a particle size of from 0.3 to 0.6 micron, consisted of an α-iron center with an $Fe_3O_4$ shell and had the following magnetic properties when run on the VSM:

| | |
|---|---|
| Ms 4,000 oe. | 106 emu/g. |
| Hc | 283 oe. |

The particles were uniformly dispersed in the heat-stable copolymer medium and there was no evidence of agglomeration.

The plating solution of this example contained the same percentage of iron chloride on a weight basis as in example 7.

EXAMPLE 9—PREPARATION OF MAGNETIC NICKEL OBLONG PARTICLES HAVING A NICKEL METAL CENTER AND A NICKEL OXIDE SHELL OF PARTICLE SIZE OF 0.1 TO 0.3 MICRON

In this example, 4 gram of $NiCl_2.6H_2O$ were dissolved in 100 ml. of dimethyl sulfoxide and plated with a DC source at a current density of 18 amp./sq. ft. The black powder formed was washed three times with dichloromethane, and the last dichloromethane wash was allowed to evaporate rather than being poured off. The black powder so produced was reduced with hydrogen for 4 hours at 3502 C., then carbon dioxide was poured over it from dry ice for 8 hours. The resulting particles had an oblong shape, a size of 0.1 to 0.3 micron and the following magnetic properties when run on the VSM:

| | |
|---|---|
| Ms 4,000 oe. | 34 emu/g. |
| Hc | 283 oe. |

The nickel oxide shell can be reduced with hydrogen by the method as shown in example 4. The reduced powder showed an increased value of Ms at 4,000 oersteds in comparison with the value for the oxide coated particles.

As shown in example 1B, similar results are achieved if the procedure of this example is carried out with $CoCl_2.6H_2O$. The cobalt particles have a pure cobalt center with a cobalt oxide shell of particle size of 0.1 to 0.3 microns and the particles can be reduced with hydrogen, as in example 4.

While there has been described and pointed out the fundamental novel features of the invention as applied to preferred embodiments, it will be understood that various omissions and substitutions and changes in the form and details of the invention illustrated may be made by those skilled in the art without departing from the spirit of the invention. It is therefore the intention thereof to be limited only as indicated by the scope of the following claims.

What is claimed is:

1. A method for preparing fine magnetic particles comprising:
   - preparing an electrodeposition bath wherein a salt of a magnetic metal is dissolved in a dialkyl sulfoxide bath;
   - providing an anode and a solid cathode electrode elements for said bath;
   - connecting an electric current source to said anode and cathode electrode elements; and
   - removing the metal particles electrodeposited on said electrode elements.

2. A method as claimed in claim 1 wherein said dialkyl sulfoxide is dimethyl sulfoxide.

3. A method as claimed in claim 2 wherein the magnetic metal salt is selected from the group consisting of salts of iron, nickel, cobalt, and mixtures thereof.

4. A method as claimed in claim 2 wherein the current source is DC and the metal particles are removed from the cathode.

5. A method as claimed in claim 2 wherein the metal particles are removed by washing the electrodes at which electrodeposition occurs.

6. A method as claimed in claim 2 wherein the metal particles are removed by immersing the electrodes at which electrodeposition occurs in an ultrasonic field.

7. A method as claimed in claim 2 wherein the current source is AC and magnetic particle electrodeposition occurs at and particles are removed from both the anode and cathode electrode elements.

8. A method as claimed in claim 2 wherein a binder consisting of flexible heat-stable film-forming organic polymer is dissolved in the electrodeposition bath to coat around the metal particles to prevent their agglomeration and oxidation.

9. A method as claimed in claim 8 wherein the heat-stable film-forming organic polymer is selected from the group consisting of copolymers of acrylonitrile and styrene, copolymers if acrylonitrile and butadiene, acrylate and styrene copolymers, aromatic polycarbonates, polyacrylic esters, polyphenyl ether, polyamides, polyesters, polyarylimides, cellulose ester, cellulose ether, vinyl chloride polymers, epoxy resin, silicone resin, fluorinated resins, polyesters of aromatic acids and polyesters reacted with blocked polyisocyanates.

10. A method as claimed in claim 2 wherein a shape-modifying additive, selected from the group consisting of sucrose, sodium saccharin and biphenyl, is added to the dimethyl sulfoxide bath prior to electroplating.

11. A method as claimed in claim 7 wherein the anode and cathode elements are formed of the same metal as the dissolved metal salts.

12. A method of manufacturing magnetic recording media comprising:

preparing an electrodeposition bath wherein a salt of a magnetic metal is dissolved in a dialkyl sulfoxide bath;

providing an anode and a solid cathode electrode elements for said bath;

connecting an electric current source to said anode and cathode electrode elements;

removing the metal particles electrodeposited on said electrode elements;

adding a heat-stable film-forming flexible binder to said magnetic particles in a volatile organic solvent for the binder to form a dispersion;

coating a base with said dispersion; and drying the coating.

13. An electrolytic bath for electrodeposition of iron, nickel, cobalt or mixtures in particle size of from about 0.03 to 0.8 micron consisting essentially of:

a dialkyl sulfoxide; and a water-soluble salt of a magnetic metal selected from the group consisting of iron, nickel, cobalt and mixtures thereof which is dissolved therein.

14. An electrolytic bath as claimed in claim 12, wherein said dialkyl sulfoxide is dimethyl sulfoxide.

15. The composition of claim 14 wherein the salt of a magnetic meal is selected from the group consisting of salts of iron, nickel, cobalt, and mixtures thereof.

16. The composition of claim 14 wherein a heat-stable film-forming organic polymer is dissolved in the electrodeposition bath to coat around the metal particles to prevent their agglomeration and oxidation.

17. The composition of claim 16 wherein the heat-stable film-forming organic polymer is selected from the group consisting of copolymers of acrylonitrile and styrene, copolymers of acrylonitrile and butadiene, acrylate and styrene copolymers, aromatic polycarbonates, polyacrylic esters, polyphenyl ether, vinyl chloride polymers, epoxy resin, silicone resin, fluorinated resins, and polyesters, including polyesters of aromatic acids and polyester reacted with blocked polyisocyanates.

18. The composition of claim 14 wherein a shape-modifying additive, selected from the group consisting of sucrose, sodium saccharin and biphenyl, is added to the dimethyl sulfoxide bath prior to electroplating.

19. Finely divided ferromagnetic particles having a size of between about 0.03 to 0.8 micron, electrodeposited from dialkyl sulfoxide and having an oblong shape, said particles having a core consisting of metal selected from the group consisting of iron, nickel, cobalt, and mixtures of these and having a surface which contains an oxide of the core metal.

20. Finely divided ferromagnetic particles as claimed in claim 19 which are coated with a film-forming, heat-stable organic binder selected from the group consisting of copolymers of acrylonitrile and styrene, copolymers of acrylonitrile and butadiene, acrylate and styrene copolymers, aromatic polycarbonates, polyacrylic esters, polyphenyl ether, polyamides, polyarylimides, cellulose ester, cellulose ether, vinyl chloride polymers, epoxy resin, silicone resin, fluorinated resins, and polyesters, including polyesters of aromatic acids and polyesters reacted with blocked polyisocyanates.

21. Finely divided ferromagnetic particles as claimed in claim 19, wherein said particles are reduced in reducing gas at elevated temperatures to convert the surface oxide to pure metal.

22. Finely divided ferromagnetic particles as claimed in claim 19, wherein said particle core consists of $\alpha$-iron and the particle surface is magnetite.

23. Finely divided ferromagnetic particles as claimed in claim 19, wherein said particle core consists of iron and cobalt and the particle surface includes magnetite.

24. Finely divided ferromagnetic particles as claimed in claim 19, wherein said particle core consists of iron, nickel and cobalt and the particle surface includes magnetite.

25. A method of manufacturing magnetic recording media comprising:

dissolving a metal salt of iron, nickel, cobalt, and mixtures thereof in a dialkyl sulfoxide bath;

electrodepositing oblong particles of a size of about 0.03 to 0.8 micron;

dispersing a heat-stable, flexible, film-forming binder in the bath to coat said particles and to prevent their agglomeration and oxidation;

removing the coated particles;

adding a solvent for the film-forming binder to the coated particles to form a dispersion;

coating a base with said dispersion; and drying the coating.